United States Patent
Schubert

(10) Patent No.: US 7,412,314 B2
(45) Date of Patent: Aug. 12, 2008

(54) SOIL TRIP VEHICLE ROLLOVER DETECTION METHOD

(75) Inventor: Peter J. Schubert, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 228 days.

(21) Appl. No.: 10/940,397

(22) Filed: Sep. 14, 2004

(65) Prior Publication Data

US 2006/0058933 A1    Mar. 16, 2006

(51) Int. Cl.
*B60R 22/00* (2006.01)
*G06F 17/00* (2006.01)

(52) U.S. Cl. ............... 701/38; 701/39; 701/45; 701/46; 701/70; 280/5.501; 280/5.502; 280/5.506; 280/5.507; 340/429; 340/440

(58) Field of Classification Search ... 280/5.501–5.507, 280/755; 701/38, 39, 45, 46, 70; 340/429, 340/440
See application file for complete search history.

(56) References Cited

U.S. PATENT DOCUMENTS

| | | | |
|---|---|---|---|
| 6,002,975 A * | 12/1999 | Schiffmann et al. | 701/36 |
| 6,282,474 B1 * | 8/2001 | Chou et al. | 701/45 |
| 6,438,463 B1 * | 8/2002 | Tobaru et al. | 701/1 |
| 6,542,792 B2 | 4/2003 | Schubert et al. | |
| 6,560,519 B2 * | 5/2003 | Williams et al. | 701/45 |
| 6,584,388 B2 | 6/2003 | Schubert et al. | |
| 6,714,848 B2 | 3/2004 | Schubert et al. | |
| 7,107,136 B2 * | 9/2006 | Barta et al. | 701/70 |
| 2002/0087235 A1 * | 7/2002 | Aga et al. | 701/1 |
| 2003/0182042 A1 * | 9/2003 | Watson et al. | 701/45 |
| 2005/0060082 A1 * | 3/2005 | Heuer et al. | 701/70 |

OTHER PUBLICATIONS

Richard J. Higgins, "Digital Signal Processing in VLSI" Prentice-Hall 1990, USA, Section 8.3.2.

* cited by examiner

*Primary Examiner*—Jack W Keith
*Assistant Examiner*—Chuong P Nguyen
(74) *Attorney, Agent, or Firm*—Jimmy L. Funke

(57) ABSTRACT

Impending rollover events are detected by recognizing a plow phase increase in lateral acceleration, coupled with a significant trip phase roll rate. The plow phase increase is recognized by modeling a typical soil trip lateral acceleration characteristic and computing a cross-correlation between the measured lateral acceleration and the modeled acceleration. The correlation is compared to a threshold that varies with the measured roll rate to reliably discriminate rollover events from near-rollover events while enabling timely deployment of suitable occupant restraints.

5 Claims, 3 Drawing Sheets

SOIL TRIP VEHICLE ROLLOVER DETECTION METHOD

TECHNICAL FIELD

The present invention relates to rollover detection in motor vehicles, and more particularly to a method of detecting an impending rollover event due to a soil trip condition.

BACKGROUND OF THE INVENTION

Various rollover detection methodologies have been developed for activating electrically deployed rollover safety devices such as air bags, side curtains, seat belt pretensioners and pop-up roll bars, and/or for activating visual, auditory or haptic warnings. Typical parameters used to detect rollover include the vehicle attitude rate of change or angular roll rate, the vehicle roll angle, the vehicle speed, the steering wheel angle, the vehicle yaw rate and the side-slip angle. For example, the U.S. Pat. No. 6,542,792 to Schubert et al., issued on Apr. 1, 2003, discloses a rollover detection algorithm that involves determining an angular roll rate vs. roll angle operating point of the vehicle, and comparing the determined operating point to one or more calibrated thresholds.

While algorithms such as the one disclosed in the aforementioned U.S. Pat. No. 6,542,792 to Schubert et al. can timely detect impending rollover events that occur relatively quickly with high roll rates, soil trip rollover events that occur when a vehicle slides sideways into soft or yielding roadside material such as soil, sand or gravel can be very difficult to detect in a timely fashion. Accordingly, what is needed is a method of reliably and timely detecting soil trip rollover events.

SUMMARY OF THE INVENTION

The present invention is directed to an improved method of detecting an impending and slowly occurring soil trip rollover event due to lateral sliding of a vehicle on soft or yielding roadside material. An impending soil trip rollover event is detected by recognizing a plow phase increase in lateral acceleration, coupled with a significant trip phase roll rate. The plow phase increase is recognized by modeling a typical soil trip lateral acceleration characteristic and computing a cross-correlation between the measured lateral acceleration and the modeled acceleration. The correlation is compared to a threshold that varies with the measured roll rate to reliably discriminate rollover events from near-rollover events while enabling timely deployment of suitable occupant restraints.

DESCRIPTION OF THE PREFERRED EMBODIMENT

Figure 1:
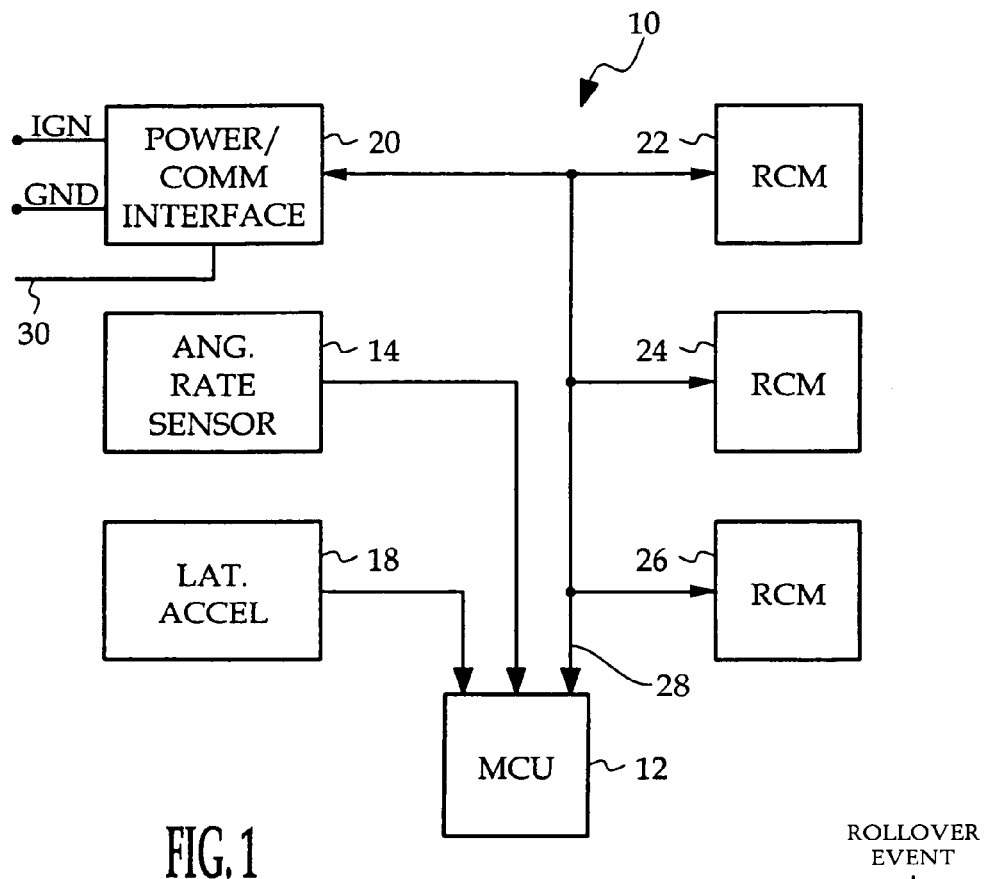
FIG. 1 is a block diagram of a rollover detection system including a microprocessor-based control unit (MCU) for carrying out the method of this invention.

Referring to FIG. 1, the method of this invention is illustrated in the context of a rollover detection system 10 including a microprocessor-based control unit (MCU) 12, an angular rate sensor 14 and a low-g range lateral accelerometer 18. The angular rate sensor 14 is responsive to angular roll rate about the longitudinal axis of a vehicle in which the system 10 is installed. The MCU 12 is coupled to a power and communication interface module 20 and various restraint control modules (RCM) 22, 24, 26 by a bi-directional data communications bus 28. General vehicle sensor data available on a serial data bus 30 is captured for MCU 12 by the interface module 20, and MCU 12 outputs a rollover deployment command signal on communications bus 28 when an impending rollover event is detected. The rollover deployment command signal activates the restraint control modules 22, 24, 26, which deploy various rollover restraints such as seat belt pretensioners, and side curtain airbag and a pop-up roll bar.

Figure 2:
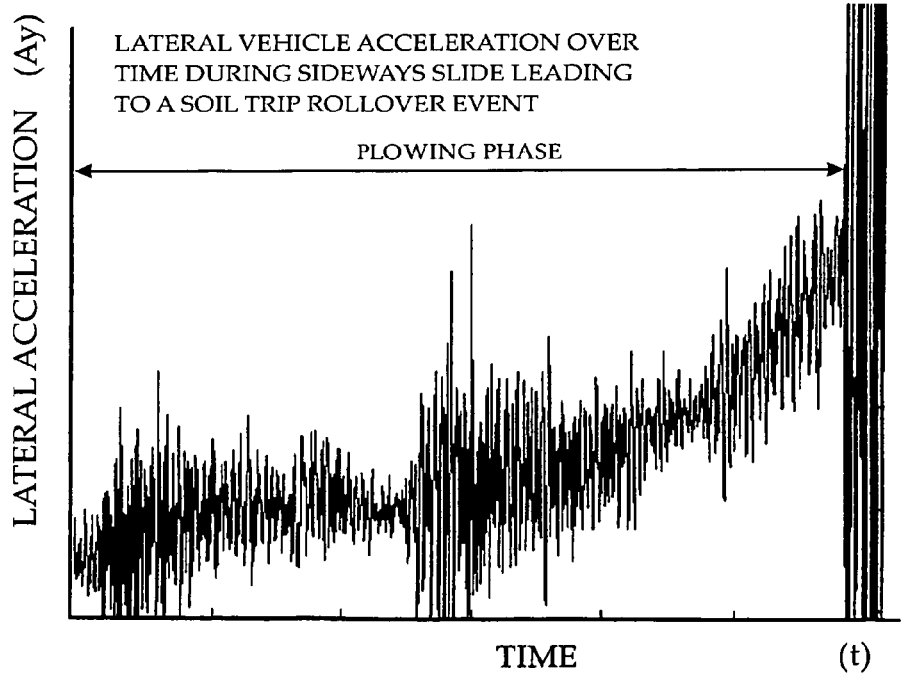
FIG. 2 graphically depicts lateral acceleration of a vehicle measured during a soil trip rollover event.

As indicated above, the present invention is particularly directed to a method carried by out by the MCU 12 for detecting a class of rollover events generally referred to as soil trip events. These events involve sideways sliding of a vehicle into soft, compliant or yielding roadside materials, such as soil, sand or gravel. In soil trip events, the tires of the vehicle plow into the roadside material, carving furrows and building up a pile of material that eventually trips rollover of the vehicle. FIG. 2 graphically depicts the lateral acceleration (Ay) of a vehicle during a sideways slide leading up to a soil trip rollover event. The lateral acceleration measurement depicted in FIG. 2 is fairly representative of soil trip events, and is characterized by a moderate amplitude, monotonic increase of Ay during a plowing phase of the soil trip event, followed by severe signal levels during a trip phase when the vehicle just begins to roll.

In general, the method of the present invention detects an impending soil trip rollover event by recognizing a plow phase increase in lateral acceleration, coupled with a significant roll rate. The plow phase increase is recognized by modeling a typical soil trip lateral acceleration characteristic and computing a correlation between the measured lateral acceleration and the modeled acceleration. The correlation is compared to a threshold that varies with the measured roll rate to reliably discriminate rollover events from near-rollover events while enabling timely deployment of suitable occupant restraints.

Figure 3:
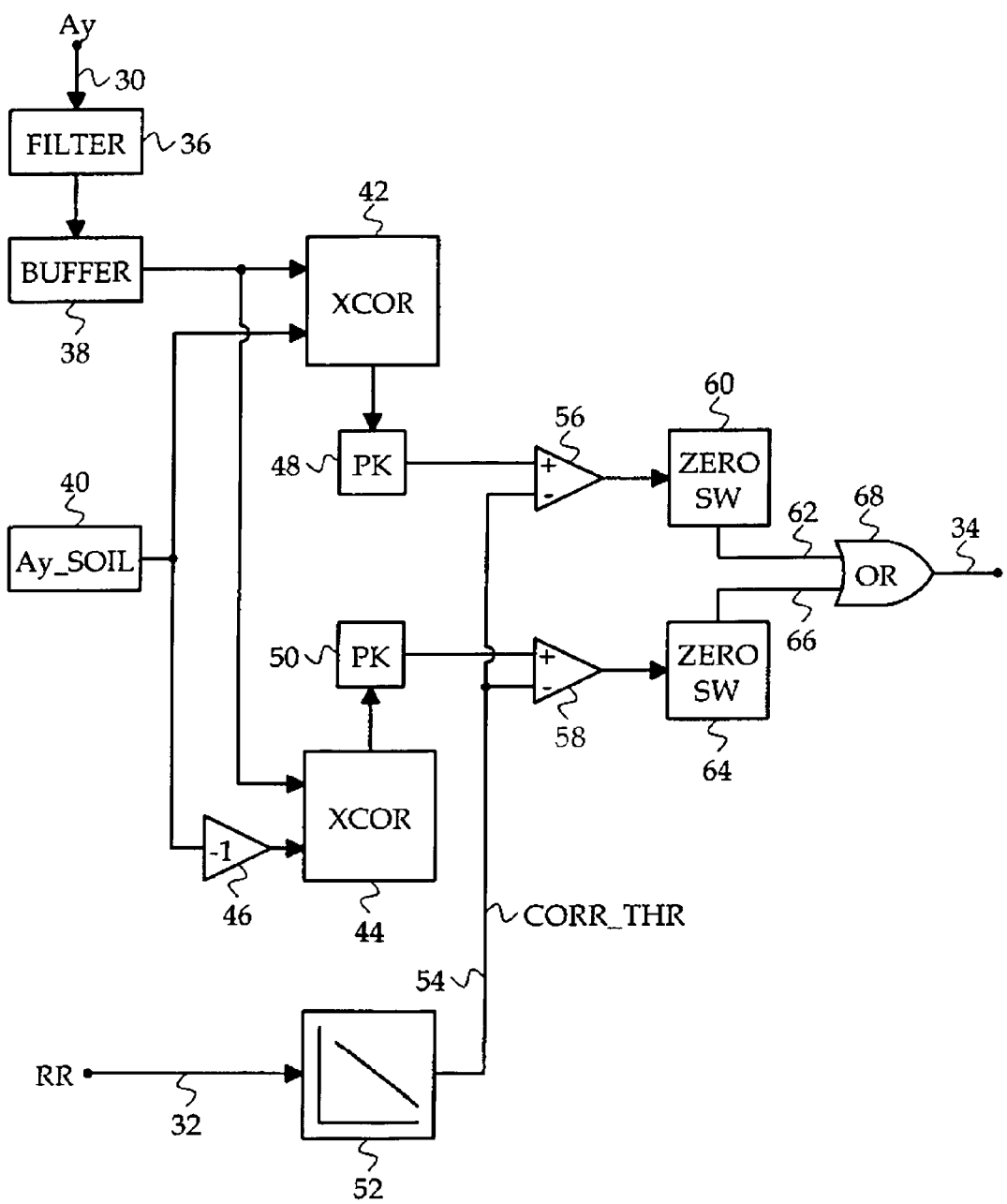
FIG. 3 is a block diagram of a soil trip rollover detection algorithm carried out by the MCU of FIG. 1 according to the method of this invention.

Referring to FIG. 3, the method of this invention is described in the context of a block diagram. The inputs include the measured lateral acceleration Ay and roll rate RR on lines 30 and 32, and the output is a deployment enable signal on line 34. The deployment enable signal may be used in combination with an arming signal or other immunity condition signal in determining whether to issue a deployment command signal. The Ay input is applied to a filter block 36, which high-pass filters low-amplitude signals while not filtering high-amplitude signals. Also, very small values of Ay are collapsed to zero. This filter function removes sensor bias from the lateral acceleration signal, and is described in detail in the aforementioned U.S. Pat. No. 6,542,792 to Schubert et al., incorporated by reference herein. The output of the filter block 36 is applied to a buffer 38 that effectively creates a vector or profile of the filtered lateral acceleration signal.

Figure 4:
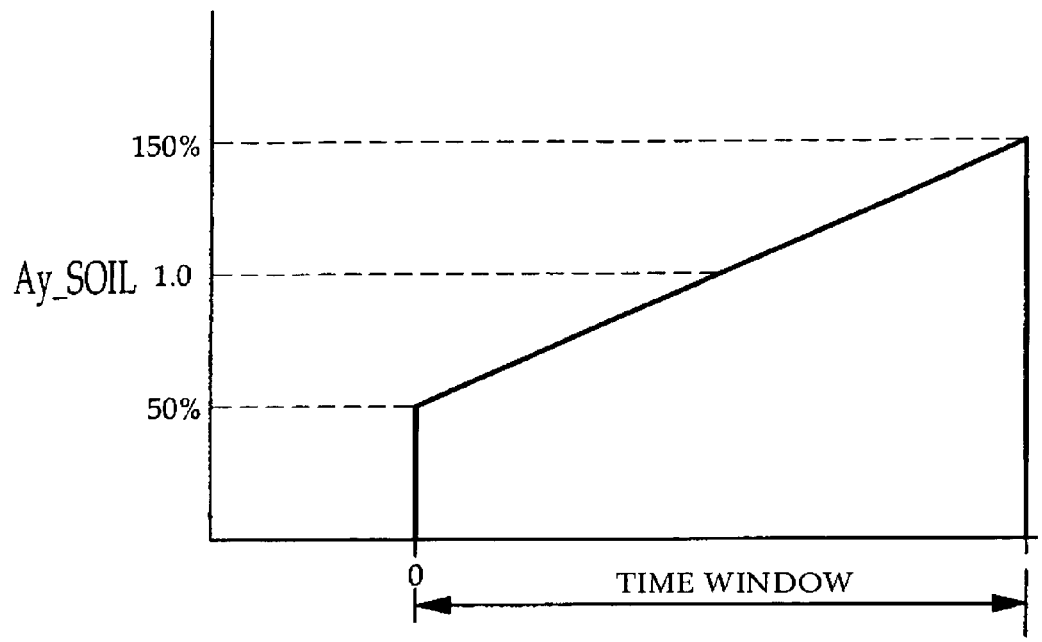
FIG. 4 graphically depicts a soil trip lateral acceleration profile developed by the block diagram of FIG. 3.

The lateral acceleration profile stored in buffer 38 is compared with a reference profile generated by block 40. The reference profile, referred to herein as Ay_SOIL, is representative of a lateral acceleration characteristic typically observed during soil trip rollover events. The profile may be defined over a predefined time window as graphically depicted in FIG. 4, with a nominal or mid-point value of one, and a calibrated variation in value below and above the nominal value. For example, the time window may have a duration of 120 msec (which would also define size of buffer 38), and Ay_SOIL may vary ±50% about the unity nominal value.

A block 42 cross-correlates the buffered Ay signal with Ay_SOIL, while a block 44 cross-correlates the buffered Ay signal with a version of Ay_SOIL inverted by an inverter block 46. The inverter block 46 simply reverses the sign of each coefficient in the Ay_Soil profile to provide paths for checking both polarities of Ay signals, depending on whether the vehicle slides to the left or to the right in a soil trip event. The cross-correlations implemented by blocks 42 and 44 preferably comprise a digital convolution technique, such as described for example in "Digital Signal Processing in VLSI", Richard J. Higgins, Prentice-Hall 1990, incorporated by reference herein. In each case, the cross-correlation generates a correlation value which indicates the closeness of match between the buffered Ay signal and Ay_SOIL (or its inverse in the case of block 44). In the plow phase of soil trip event, the respective correlation output will gradually increase as the buffered Ay signal slides across Ay_SOIL, and then gradually decrease as the input signal progresses beyond the observation window of Ay_SOIL. The peak correlation in the positive path is captured by a block 48, and the peak correlation in the negative path is captured by a block 50.

Figure 5:
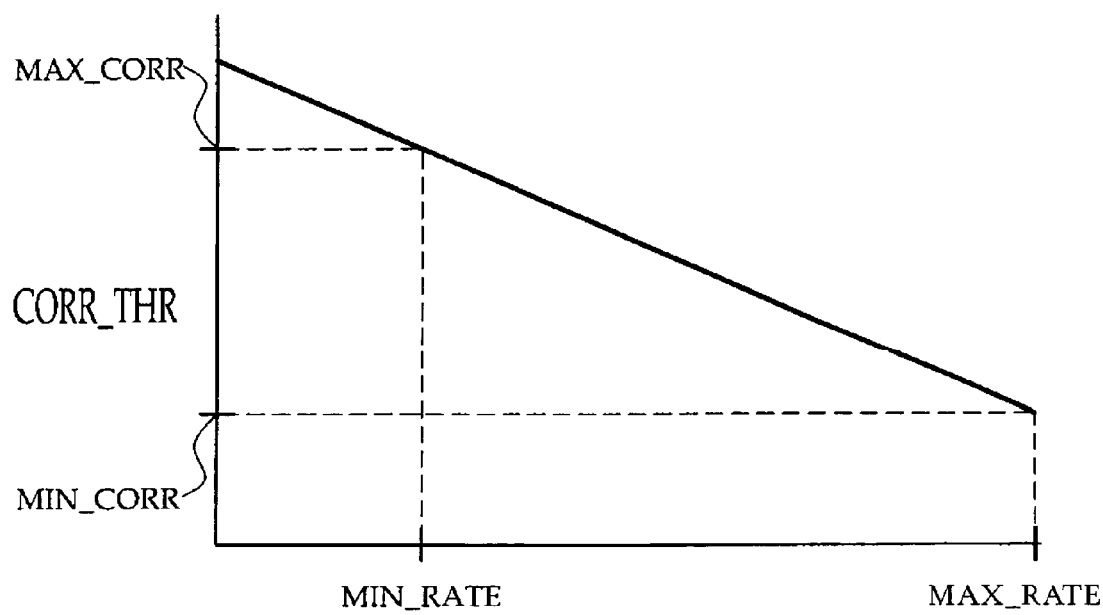
FIG. 5 graphically depicts a correlation threshold developed by the block diagram of FIG. 3.

A block 52 is responsive to the measured roll rate RR and generates a roll rate dependent correlation threshold CORR_THR on a line 54 for comparison with the peak correlation values captured by blocks 48 and 50. As depicted in FIG. 5, the threshold CORR_THR is inversely proportional to roll rate RR and is scaled based on the size of the Ay buffer 38 to account for the fact that the maximum achievable correlation value (MAX_CORR) depends on the buffer length. As shown in FIG. 5, CORR_THR is scaled so that MAX_CORR corresponds to a minimum roll rate MIN_RATE for detection of a soil trip rollover event. This essentially rules out deployment of restraints for events in which the roll rate RR is lower than MIN_RATE. The minimum correlation value (MIN_CORR) corresponds to the maximum roll rate (MAX_RATE) for a typical sensor.

Referring back to FIG. 4, blocks 56 and 58 subtract the correlation threshold CORR_THR from the peak correlation values captured by the blocks 48 and 50. A zero switch 60 produces a logical one output on a line 62 when the peak correlation value captured by block 48 exceeds CORR_THR, and a zero switch 64 produces a logical one output on line a 66 when the peak correlation value captured by block 50 exceeds CORR_THR. An OR-gate 68 produces a deployment enable signal on line 34 when one or both of the blocks 60 and 64 produce a logical one output.

In summary, the method of the present invention provides reliable and timely detection of a soil trip rollover event by discriminating both plow phase and trip/roll phase portions of the event. While the invention has been described with respect to the illustrated embodiment, it is recognized that numerous modifications and variations in addition to those mentioned herein will occur to those skilled in the art. For example, matching of the correlation threshold with the maximum correlation value may be achieved by scaling the peak correlation values instead of the threshold, the correlation threshold may be non-linear, and so on. Accordingly, it is intended that the invention not be limited to the disclosed embodiment, but that it have the full scope permitted by the language of the following claims.

The invention claimed is:

1. A method of detecting an impending soil trip rollover event of a vehicle, comprising the steps of:
   determining a roll rate and a lateral acceleration of the vehicle;
   sampling the determined lateral acceleration and buffering a plurality of sampled values to create a measured lateral acceleration profile;
   modeling a reference lateral acceleration profile characteristic of a plow phase of a soil trip rollover event for said vehicle;
   cross-correlating said measured and modeled lateral acceleration profiles and identifying a first peak correlation value;
   establishing a correlation threshold that decreases with increasing values of the determined roll rate; and
   detecting the impending rollover event when said first peak correlation value crosses said correlation threshold.
   wherein said modeled lateral acceleration profile spans a predefined time interval, and increases linearly with time.

2. The method of claim 1, wherein said correlation threshold associates a maximum value of said peak correlation value with a minimum measured vehicle roll rate.

3. The method of claim 1, including the step of:
   filtering the sampled lateral acceleration values and buffering a plurality of filtered values to create said first lateral acceleration profile.

4. The method of claim 1, including the steps of:
   inverting said modeled lateral acceleration profile;
   cross-correlating said measured and inverted modeled lateral acceleration profiles and identifying a second peak correlation value; and
   detecting the impending rollover event when said first or second peak correlation values cross said correlation threshold.

5. A method of detecting a plow phase of an impending soil trip event of a vehicle, comprising the steps of:
   determining a roll rate and a lateral acceleration of the vehicle;
   sampling the determined lateral acceleration and buffering a plurality of sampled values to create a first lateral acceleration profile;
   establishing a second lateral acceleration profile characteristic of a plow phase of a soil trip rollover event;
   cross-correlating said first and second lateral acceleration profiles and identifying a first peak correlation value;
   establishing a correlation threshold that decreases with increasing values of the determined roll rate; and
   detecting an impending soil trip event when said first peak correlation value crosses said correlation threshold.

* * * * *